(12) United States Patent
Omura et al.

(10) Patent No.: US 9,951,249 B2
(45) Date of Patent: Apr. 24, 2018

(54) AQUEOUS COATING AGENT AND GAS BARRIER FILM

(71) Applicant: Toppan Printing Co., Ltd., Tokyo (JP)

(72) Inventors: Yuki Omura, Tokyo (JP); Junichi Kaminaga, Tokyo (JP); Sayaka Hoshi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/921,720

(22) Filed: Oct. 23, 2015

(65) Prior Publication Data

US 2016/0040035 A1 Feb. 11, 2016

Related U.S. Application Data

(63) Continuation of application No. PCT/JP2014/061320, filed on Apr. 22, 2014.

(30) Foreign Application Priority Data

Apr. 25, 2013 (JP) .................................. 2013-093026

(51) Int. Cl.

| C09D 175/04 | (2006.01) |
|---|---|
| C09D 129/04 | (2006.01) |
| C08K 3/34 | (2006.01) |
| C09D 7/12 | (2006.01) |
| C09D 201/00 | (2006.01) |
| B32B 27/40 | (2006.01) |
| C08G 18/70 | (2006.01) |
| C08G 18/76 | (2006.01) |
| C08G 18/80 | (2006.01) |
| C08G 18/08 | (2006.01) |
| C08G 18/32 | (2006.01) |
| C08G 18/34 | (2006.01) |
| C08K 5/544 | (2006.01) |
| C09J 175/06 | (2006.01) |
| C08J 5/18 | (2006.01) |

(52) U.S. Cl.
CPC ............ *C09D 175/04* (2013.01); *B32B 27/40* (2013.01); *C08G 18/0823* (2013.01); *C08G 18/3206* (2013.01); *C08G 18/3271* (2013.01); *C08G 18/348* (2013.01); *C08G 18/706* (2013.01); *C08G 18/7642* (2013.01); *C08G 18/8048* (2013.01); *C08J 5/18* (2013.01); *C08K 3/34* (2013.01); *C08K 5/544* (2013.01); *C09D 7/12* (2013.01); *C09D 129/04* (2013.01); *C09D 201/00* (2013.01); *C09J 175/06* (2013.01)

(58) Field of Classification Search
CPC .. C09D 129/04; C09D 179/04; C09D 201/00; C09D 7/12; C09D 7/1258; C08K 3/346; C08K 3/34; C08K 5/544; C08L 29/04; C08L 75/04; B32B 27/40; C08G 18/0823; C08G 18/3206; C08G 18/3271; C08G 18/348; C08G 18/706; C08G 18/7642; C08G 18/8048; C08J 5/18; C09J 175/06
USPC ...................................................... 428/423.1
See application file for complete search history.

(56) References Cited

U.S. PATENT DOCUMENTS

| 5,149,591 | A | * | 9/1992 | Patitsas .................... C08J 7/047 428/423.1 |
|---|---|---|---|---|
| 6,569,533 | B1 | | 5/2003 | Uchida et al. |
| 2003/0207122 | A1 | | 11/2003 | Uchida et al. |
| 2003/0225201 | A1 | * | 12/2003 | Yamana .................. B32B 27/34 524/589 |
| 2004/0253463 | A1 | * | 12/2004 | Inui .......................... B32B 27/06 428/448 |
| 2005/0084686 | A1 | | 4/2005 | Imaizumi |
| 2006/0177669 | A1 | | 8/2006 | Yamana et al. |
| 2007/0031679 | A1 | | 2/2007 | Ushida et al. |
| 2014/0370270 | A1 | * | 12/2014 | Kaminaga ............... B32B 27/40 428/324 |

FOREIGN PATENT DOCUMENTS

| EP | 1 081 170 A2 | 3/2001 |
|---|---|---|
| JP | H 6-93133 | 4/1994 |
| JP | H 9-150484 | 6/1997 |
| JP | H09-151265 A | 6/1997 |
| JP | H11-165369 A | 6/1999 |
| JP | 2001-287294 A | 10/2001 |
| JP | 3351208 B2 | 9/2002 |
| JP | 2002309023 A * | 10/2002 |

(Continued)

OTHER PUBLICATIONS

Chinese Office Action issued in Chinese Application No. 201480023344.2 dated Sep. 7, 2016.

(Continued)

*Primary Examiner* — Thao T Tran

(74) *Attorney, Agent, or Firm* — Foley & Lardner LLP

(57) ABSTRACT

An aqueous coating agent of the invention comprising (A) an aqueous polyurethane resin containing a polyurethane resin having an acid group and a polyamine compound, (B) a water-soluble polymer, and (C) an inorganic layered mineral as main constituents, wherein solid formulation ratios of the aqueous polyurethane resin (A), the water-soluble polymer (B) and the inorganic layered mineral (C) occupied in a total solid content of the aqueous coating agent are within approximate ranges indicated below.

Aqueous polyurethane resin (A): 5 to 60 mass %

Water-soluble resin (B): 25 to 80 mass %

Inorganic layered compound (C): 8 to 20 mass %

6 Claims, No Drawings

(56) References Cited

FOREIGN PATENT DOCUMENTS

| JP | 2005-138581 A | 6/2005 |
| JP | 2005-139435 A | 6/2005 |
| JP | 2005-139436 A | 6/2005 |
| JP | H 3764109 B2 | 4/2006 |
| TW | 200303335 A | 9/2003 |

OTHER PUBLICATIONS

Thomson Scientific, Database WPI, XP-002761603, London, GB, AN 1997-359178.
Extended European Search Report issued in European Patent Application No. 14787805.2 dated Oct. 25, 2016.
International Search Report issued in PCT/JP2014/061320 dated Aug. 5, 2014.
Office Action issued in Japanese Patent Application No. 2013-093026 dated Aug. 30, 2016 with its English translation.
Office Action dated Jun. 30, 2017 in Taiwanese Patent Application No. 103114782.

\* cited by examiner

US 9,951,249 B2

AQUEOUS COATING AGENT AND GAS BARRIER FILM

CROSS-REFERENCE TO RELATED PATENT APPLICATIONS

This application is a continuation application filed under 35 U.S.C. 111(a) claiming the benefit under 35 U.S.C. § § 120 and 365(c) of PCT International Application No. PCT/JP2014/061320 filed on Apr. 22, 2014, which is based upon and claims the benefit of priority of Japanese Application No. 2013-093026, filed on Apr. 25, 2013, the entire contents of them all are hereby incorporated by reference.

TECHNICAL FIELD

This invention relates to an aqueous coating agent and a gas barrier film which are used for packaging materials of foods, which hate moisture or oxygen, such as dried foods, confectionaries, breads and pastries, delicacies and the like and also of medical goods such as disposable body warmers, tablets, powders, poultices, adhesive skin patches or the like. More particularly, the invention relates to an aqueous coating agent and a gas barrier film used in packaging fields requiring high gas barrier properties and such a transparency as to enable content recognition.

BACKGROUND

Packaging materials used for foods and medical goods should have such properties (gas barrier properties) of interrupting the permeation of water vapor, oxygen and other gases capable of causing content quality to be deteriorated so as to suppress the content from being deteriorated or decayed and retain the function and properties of foods and medical goods.

Therefore, these packaging materials have been hitherto provided with a gas barrier layer made of a material having gas barrier properties. Until now, the gas barrier layer has been formed on a base material such as a film or paper according to a sputtering or vacuum deposition method, or a wet coating or printing method. The gas barrier layer used thus far includes a metal foil or metal deposition film made of a metal such as aluminum, or a resin film such as of polyvinyl alcohol, an ethylene/vinyl alcohol copolymer, polyvinylidene chloride or the like (see, for example, Patent Literatures 1 to 5).

However, although the metal foil or metal deposition film is excellent in gas barrier properties, they have many problems in that a content cannot be confirmed because of opaqueness thereof, cracks occur by several percent elongation owing to poor elasticity thereby causing gas barrier properties to be lowered, and they have to be treated as an incombustible waste at the time of disposal after use.

The gas barrier layer made of a resin film such as of polyvinylidene chloride shows humidity dependence-free, good gas barrier properties, but with the possibility that it becomes a generation source of harmful substances such as dioxins when subjected to waste disposal treatment. Thus, packaging materials including chlorine-based materials tend to be hated.

On the other hand, although a gas barrier layer formed of a resin film such as of polyvinyl alcohol or ethylene/vinyl alcohol copolymer shows high gas barrier properties in an atmosphere of low humidity, the layer is humidity-dependent in nature, with the attendant drawback that the gas barrier properties lower greatly as temperature rises.

With other types of gas barrier resin films, the gas barrier properties are inferior to those of a polyvinylidene chloride resin film, or a polyvinyl alcohol resin film in an atmosphere of low humidity.

In order to improve the gas barrier properties of these resin films, there have been proposed composite resin films of resins and inorganic layered minerals. With the composite resin film, it is necessary that an inorganic layered mineral be distributed and arranged in order in the inside of the film so as to allow improved gas barrier properties. However, as the inorganic layered mineral is distributed and arranged in order, the cohesive force of the resin film and the adhesion force of the film to a base material lower. Thus, it is very difficult to satisfy both of high gas barrier properties and adhesion strength sufficient for use as a packaging material.

Besides, a proposal has been made wherein an aqueous polyurethane is added to the above-mentioned composite material of polyvinyl alcohol or ethylene/vinyl alcohol copolymer and a layered compound thereby providing a gas barrier film having an improved adhesion of the composite material to a base material (see, for example, Patent Literature 6). However, this gas barrier film has been such that the gas barrier properties at a high humidity of not less than 80% are not satisfactory.

On the other hand, there has been proposed a gas barrier resin laminate film that is comprised of a polyurethane resin having a high concentration of an urethane group or urea group and a polyamine and is good in adhesion to a base material and low in humidity dependence (see, for example, Patent Literature 7). However, this gas barrier film is inferior to a resin film made of the above-indicated polyvinylidene chloride with respect to gas barrier properties and thus, limitation is placed on its application as a gas barrier packaging material.

With a laminate film wherein an adhesive is coated onto a film side (or on a film) on which another type of film is bonded, there is required laminate strength sufficient not to cause degradation over time.

CITATION LIST

Patent Literature

Patent Literature 1: Japanese Unexamined Patent Application No. 2001-287294

Patent Literature 2: Japanese Unexamined Patent Application No. Hei 11-165369

Patent Literature 3: Japanese Unexamined Patent Application No. Hei 6-93133

Patent Literature 4: Japanese Unexamined Patent Application No. Hei 9-150484

Patent Literature 5: Japanese Patent Publication No. 3764109

Patent Literature 6: Japanese Patent Publication No. 3351208

Patent Literature 7: Japanese Patent Publication No. 4434907

SUMMARY OF THE INVENTION

The invention has been made under such circumstances as stated above and has for its object the provision of a gas barrier film that has excellent gas barrier properties in an atmosphere of high humidity, has adhesion strength and film cohesive strength sufficient for use as a packaging material over a long period of time and is unlikely to undergo laminate strength degradation.

An aqueous coating agent according to a first embodiment of the invention comprises (A) an aqueous polyurethane resin containing a polyurethane resin having an acid group and a polyamine compound, (B) a water-soluble polymer, and (C) an inorganic layered mineral as main constituents, wherein solid formulation ratios of the aqueous polyurethane resin (A), the water-soluble polymer (B) and the inorganic layered mineral (C) in a total solid content of the aqueous coating agent are within approximate ranges indicated below.

Aqueous polyurethane resin (A): 5 to 60 mass %
Water-soluble resin (B): 25 to 80 mass %
Inorganic layered compound (C): 8 to 20 mass %

In the first embodiment of the invention, the water-soluble polymer (B) may be made of a polyvinyl alcohol resin having a degree of saponification of not less than about 95%.

In the first embodiment of the invention, the inorganic layered mineral may be made of a water-swellable synthetic mica.

A gas barrier film according to a second embodiment of the invention comprises a base material film made of a plastic material, and a film which is formed on one or opposite surfaces of the base material film and is comprised of (A) an aqueous polyurethane resin containing a polyurethane resin having an acid group and a polyamine compound, (B) a water-soluble polymer, and (C) an inorganic layered mineral as main constituents, wherein solid formulation ratios of the aqueous polyurethane resin (A), the water-soluble polymer (B) and the inorganic layered mineral (C) in a total solid content of the aqueous coating agent are within approximate ranges indicated below.

Aqueous polyurethane resin (A): 5 to 60 mass %
Water-soluble resin (B): 25 to 80 mass %
Inorganic layered compound (C): 8 to 20 mass %

In the second embodiment of the invention, the water-soluble polymer may be made of a polyvinyl alcohol resin having a degree of saponification of not less than about 95%.

In the second embodiment of the invention, the inorganic layered mineral may be made of a water-swelling synthetic mica.

The aqueous coating agent according to the first embodiment of the invention comprises an aqueous polyurethane resin (A), a water-soluble polymer (B) and an inorganic layered mineral (C) as main constituents wherein the solid formulation ratios of these constituents are controlled within given ranges. In doing so, the film formed of the aqueous coating agent is enabled to have excellent gas barrier properties in an atmosphere of high humidity and is good in adhesion of the film to a base material and also in cohesive force of the film over a long period of time. When using a gas barrier film having such a film as stated above as a packaging material, the quality retention of a content is enhanced and its use can be made as a variety of packaging materials.

The gas barrier film according to the second embodiment of the invention has a film made of main constituents of an aqueous polyurethane resin (A), a water-soluble polymer (B) and an inorganic layered mineral (C). The solid formulation ratios of these constituents are controlled within given ranges, respectively, so that there can be obtained a gas barrier film that is excellent in gas barrier properties in an atmosphere of high humidity and good in adhesion of the film to a base material and also in cohesive force of the film over a long period of time. Hence, when an adhesive is applied onto the film side (onto the film) and other type of film is bonded thereto, the laminate strength of the resulting laminate film can be reduced in degradation. Using the laminate film as a packaging material, the quality retention of a content can be enhanced and its use can be made as a variety of packaging materials.

DESCRIPTION OF EMBODIMENTS

The aqueous coating agent of the first embodiment of the invention and the gas barrier film of the second embodiment of the invention are now described. It will be noted that the embodiments are described to more particularly illustrate the invention for better understanding the scope of the invention and should not be construed as limiting the invention thereto unless otherwise indicated.

[Aqueous Coating Agent]

The aqueous coating agent of the first embodiment of the invention comprises (A) an aqueous polyurethane resin containing a polyurethane resin having an acid group and a polyamine compound, (B) a water-soluble polymer, and (C) an inorganic layered mineral as main constituents wherein solid formulation ratios of the aqueous polyurethane resin (A), the water-soluble polymer (B) and the inorganic layered mineral (C) in a total solid content of the aqueous coating agent are within approximate ranges indicated below.

Aqueous polyurethane resin (A): 5 to 60 mass %
Water-soluble polymer (B): 25 to 80 mass %
Inorganic layered mineral (C): 8 to 20 mass %

[Aqueous Polyurethane Resin (A)]

The acid group of a polyurethane resin (anionic self-emulsifying polyurethane resin) serving as a constituent of the aqueous polyurethane resin (A) includes a carboxyl group, a sulfonic acid group and the like.

The acid group may be located at an terminal end or a side chain and is preferably located at least at a side chain. This acid group may be generally neutralized with a neutralizer (base) and may form a salt with a base. It is to be noted that the acid group is able to bond with an amino group (or an imino group or tertiary nitrogen atom) of a polyamine compound serving as a constituent of the aqueous polyurethane resin (A).

The acid value of the polyurethane resin can be selected within a range capable of imparting water solubility or water dispersability and is preferably at 5 to 100 mg KOH/g, more preferably at 10 to 70 mg KOH/g and most preferably at 15 to 60 mg KOH/g.

From the standpoint of gas barrier properties, the total concentration of the urethane group and urea group (urea group) of the polyurethane resin is preferably at not less than 15 mass %, more preferably at 20 to 60 mass %.

It will be noted that the urethane group concentration or urea group concentration, respectively, mean a value obtained by dividing the molecular weight of urethane group (50 g/equivalent) or the molecular weight of the urea group (primary amino group (amino group)=58 g/equivalent, secondary amino group (amino group)=57 g/equivalent) by the molecular weight of the recurring units of the polyurethane resin.

It will also be noted that where a mixture is used for the polyurethane resin, the urethane group concentration and the urea group concentration can be calculated from the charge base of reaction components, i.e. the ratios of the respective components.

The polyurethane resin should preferably have, at least, rigid units (units constituted of a hydrocarbon ring) and short-chain units (e.g. units constituted of a hydrocarbon chain). More particularly, the repeating units of the polyurethane resin are preferably those that contain a hydrocarbon ring (an aromatic and/or non-aromatic hydrocarbon ring) derived from at least one of a polyisocyanate component, a polyhydroxy acid component and a polyol component, and a chain extender (especially, derived from at least a polyisocyanate component).

The ratio of the units made of a hydrocarbon ring in the recurring units of the polyurethane resin is preferably at 10 to 70 mass %, more preferably at 15 to 65 mass % and most preferably at 20 to 60 mass %.

The number average molecular weight of the polyurethane resin may be appropriately selected and is preferably at 800 to 1,000,000, more preferably at 800 to 200,000 and much more preferably at 800 to 100,000.

In order to enhance gas barrier properties, the polyurethane resin may be crystalline.

The glass transition point of the polyurethane resin is preferably at not less than 100° C. (e.g. about 100 to 200° C.), more preferably at not less than 110° C. (e.g. about 110 to 180° C.) and much more preferably at not less than 120° C. (e.g. about 120 to 150° C.).

It is preferred that the aqueous polyurethane resin (A) contains a neutralizer and the polyurethane resin thus discussed above is formed in the state of being dissolved or dispersed in an aqueous medium.

The aqueous medium includes water, a water-soluble solvent, a hydrophilic solvent or a mixture thereof. Water or an aqueous solvent containing water as a major component is preferred.

For the hydrophilic solvent, mention is made, for example, of alcohols such as ethanol, isopropanol and like; ketones such as acetone, methyl ethyl ketone and the like; ethers such as tetrahydrofuran and the like; cellosolves; carbitols; and nitriles such as acetonitrile and the like.

The aqueous polyurethane resin (A) may be in any form of an aqueous solution of dissolving the polyurethane resin or an aqueous dispersion of dispersing the polyurethane resin in an aqueous medium.

In the aqueous dispersion, the average particle size of dispersed particles (polyurethane resin particles) is not critical and is preferably at 20 to 500 nm, more preferably at 25 to 300 nm and most preferably at 30 to 200 nm.

The procedure of preparing the aqueous polyurethane resin (A) is not specifically limited, for which there are used ordinary aqueous conversion techniques such as an acetone method, a prepolymer method and the like.

For the urethanation reaction, urethanation catalysts such as amine catalysts, tin catalysts, lead catalysts and the like may be used, if necessary.

For instance, a polyisocyanate compound, a polyhydroxy acid and, if necessary, at least one of a polyol component and a chain extender component are reacted in an inert organic solvent including a ketone such as acetone, an ether such as tetrahydrofuran or a nitrile such as acetonitrile to prepare an aqueous polyurethane resin (A). More particularly, a polyisocyanate compound, a polyhydroxy acid and a polyol component are reacted in an inert organic solvent (especially, a hydrophilic or water-soluble organic solvent selected among inert organic solvents) to form a prepolymer having an isocyanate group at terminals. Next, the prepolymer is neutralized with a neutralizer and dissolved or dispersed in an aqueous medium, to which a chain extender component is subsequently added, followed by removal of the organic solvent to prepare an aqueous polyurethane resin (A).

With the aqueous polyurethane resin (A), gas barrier properties are developed by bonding between the polyamine compound serving as a crosslinking agent and the acid group of the polyurethane resin.

It will be noted that the bonding between the polyamine compound and the acid group of the polyurethane resin may be ionic bonding (e.g. ionic bonding between a tertiary amino group and a carboxyl group), or may also be covalent bonding (e.g. amide bonding).

To this end, the polyamine compounds used include a variety of polyamines having two or more of basic nitrogen atoms selected from the group consisting of a primary amino group, a secondary amino group and a tertiary amino group.

The polyamine compound serving as one constituent of the aqueous polyurethane resin (A) is not specifically critical so far as it is able to bond with an acid group and improve gas barrier properties, for which a diversity of compounds may be used.

The amine value of the polyamine compound is preferably at 100 to 1900 mg KOH/g, more preferably at 150 to 1900 mg KOH/g (e.g. 200 to 1700 mg KOH/g), and most preferably at 200 to 1900 mg KOH/g (e.g. 300-1500 mg KOH/g). The amine value of the polyamine compound may be approximately at 300 to 1900 mg KOH/g.

[Water Soluble Polymer (B)]

The water-soluble polymer (B) means one that is completely dissolved in or finely dispersed in water at a normal temperature.

The water-soluble polymer (B) is not specifically limited to so far as it is able to permit interstitial invasion or intercalation between unit crystal layers of an inorganic layered mineral (C) described hereinafter. For example, mention is made of polyvinyl alcohol and derivatives thereof, cellulose derivatives such as carboxymethyl cellulose, hydroxyethyl cellulose and the like, starches such as oxidized starch, etherized starch, dextrin and the like, polyvinylpyrrolidone, polyacrylic acid and polymethacrylic acid or esters, salts and copolymers thereof, copolymerized polyesters containing a polar group such as sulfoisophthalic acid, vinyl polymers such as polyhydroxyethyl methacrylate and copolymers thereof, urethane polymers, or a variety of the above-indicated polymers whose functional group, such as a carboxyl group, is modified.

The water-soluble polymer (B) is preferably a polyvinyl alcohol resin whose degree of saponification is not less than about 95%. With polyvinyl alcohol resin, higher degrees of saponification and polymerization tend to have lower hygroscopicity and swellability. In the case where the degree of saponification is not less than about 95%, adequate gas barrier properties are likely to be obtained.

In this embodiment, the water-soluble polymer (B) may contain, as at least one component, a polyvinyl alcohol polymer and its derivative, and a polyvinyl alcohol resin having a degree of saponification of not less than about 95% and a degree of polymerization of not less than about 400 may be used.

If the degree of polymerization of polyvinyl alcohol resin is not less than about 400, there can be obtained a film whose gas barrier properties and cohesive strength are excellent.

[Inorganic Layered Mineral (C)]

The inorganic layered mineral (C) means an inorganic compound wherein very thin unit crystal layers are superposed to form one layered particle.

For inorganic layered mineral (C), those that are able to be swelled and cleft in water are preferred. Among them, clay compounds having swellability in water are preferably used. More particularly, the clay compound is one which enables water to be intercalated between very thin unit crystal layers and thus, has properties of absorption and swelling, and is generally a compound wherein a layer of a tetrahedral structure formed by coordination of $Si^{4+}$ with $O^{2-}$ and a layer of an octahedral structure formed by coordination of Al3+, Mg2+, Fe2+, Fe3+ or the like with O2− and OH− are bonded at a ratio of 1:1 or 2:1 and superposed to form a layered structure. This clay compound may be either a natural or synthetic one.

Typical compounds of the inorganic layered mineral (C) include hydrous silicates such as ferrosilicate salt minerals. Examples include kaolinite minerals such as halloysite, kaolinite, endellite, dickite, nacrite and the like, antigorite clay minerals such as amtigorite, chrysotile and the like, sumectite clay minerals such as montmorillonite, beidellite, nontronite, saponite, hectorite, sokonite, stevensite and the like, vermiculite clay minerals such as vermiculite, micas such as muscovite, phlogopite and the like, and isinglass or mica clay minerals such as margarite, tetrasililic mica, taeniolite and the like.

These inorganic layered minerals (C) are used singly or in combination of two or more.

Of these inorganic layered minerals (C), smectite clays minerals such as montmorillonite and the like and mica clay minerals such as water-swelling micas and the like are preferred.

From the standpoint that a high aspect ratio leads to excellent barrier properties of film, the size of the inorganic layered mineral (C) is preferably such that an average particle size is at not larger than 10 μm and a thickness is 500 nm or below. Among inorganic layered minerals (C), at least one kind of mineral should preferably be a water-swelling synthetic mica having an average particle size of 1 to 10 μm and a thickness of 10 to 100 nm.

When using a water-swelling synthetic mica as the inorganic layered mineral (C), the water-swelling synthetic mica is high in compatibility with the aqueous polyurethane resin (A) and the water-soluble polymer (B) and has a reduced content of impurities over natural micas, so that gas barrier properties and film cohesive force are not lowered owing to the impurities. Because of the fluorine atom contained in the crystal structure, the water-swelling synthetic mica contributes to suppressing the humidity dependence of the gas barrier properties of the film formed of the aqueous coating agent. Moreover, because of a higher aspect ratio than other types of water-swelling inorganic layered minerals, the labyrinth effect works more effectively, and the water-swelling synthetic mica contributes to high development of gas barrier properties of the film formed of the aqueous coating agent.

The aqueous coating agent of this embodiment has solid formulation ratios of the aqueous polyurethane resin (A), the water-soluble polymer (B) and the inorganic layered mineral (C) occupied in the total solids of the aqueous coating agent within approximate ranges indicated below.

Aqueous polyurethane resin (A): 5 to 60 mass %
Water-soluble polymer (B): 25 to 80 mass %
Inorganic layered mineral (C): 8 to 20 mass %

In the aqueous coating agent of this embodiment, the formulation ratio of the aqueous polyurethane resin (A) occupied in the total solids of the aqueous coating agent is at 5 to 60 mass %, preferably at 5 to 55 mass %, more preferably at 5 to 50 mass % and most preferably at 5 to 45 mass %.

If the solid formulation ratio of the aqueous polyurethane resin in the total solids of the aqueous coating agent is less than 5 mass %, the wettability and adhesion of the film formed of the aqueous coating agent to a base material film becomes insufficient.

On the other hand, when the solid formulation ratio of the aqueous polyurethane resin (A) exceeds 60 mass %, the cohesive force of the film formed of the aqueous coating agent is lowered as times passes.

In the aqueous coating agent of the embodiment, the formulation ratio of the water-soluble polymer (B) occupied in the total solids of the aqueous coating agent is at 25 to 80 mass %, preferably at 30 to 80 mass %, more preferably at 30 to 75 mass % and most preferably at 35 to 75 mass %.

If the solid formulation ratio of the water-soluble polymer (B) occupied in the total solids of the aqueous coating agent is less than 25 mass %, the cohesive strength of the film formed of the aqueous coating agent is lowered with time. On the other hand, when the solid formulation ratio of the water-soluble polymer (B) occupied in the total solids of the aqueous coating agent exceeds 80 mass %, the wettability and adhesion of the film to a base material film becomes insufficient.

In the aqueous coating agent of the embodiment, it is considered that if the solid formulation ratio of the water-soluble polymer occupied in the total solids of the aqueous coating agent is increased, the rate of the water-soluble polymer (B) to be intercalated between the unit crystal layers of the inorganic layered mineral (C) can be increased. This is assumed to be why there can be obtained a bas barrier film whose laminate strength is reduced in time degradation.

In the aqueous coating agent of the embodiment, the formulation ratio of the inorganic layered mineral (C) occupied in the total solids of the aqueous coating agent is at 8 to 20 mass %, preferably at 8 to 18 mass %, more preferably at 10 to 18 mass % and most preferably at 10 to 15 mass %.

If the solid formulation ratio of the inorganic layered mineral (C) occupied in the total solids of the aqueous coating agent is less than 8 mass %, satisfactory gas barrier properties are not obtained with respect to the film formed of the aqueous coating agent. On the other hand, when the solid formulation ratio of the inorganic layered mineral (C) occupied in the total solids of the aqueous coating agent exceeds 20 mass %, the adhesion of the film formed of the aqueous coating agent to a base material film and the cohesive strength of the film are both lowered as time passes.

In the case where the solid formulation ratios are outside the given ranges and the film cohesive strength and the adhesion strength of the film to a base material are lowered with time, a laminate film wherein other type of film is bonded to by application of an adhesive onto the film side (or on the film) is degraded in laminate strength with time.

When a water-soluble or water-dispersing reactive curing agent is added to the aqueous coating agent of the present embodiment, adhesion to base material, film cohesive strength and resistances to water and solvent can be further improved.

Such reactive curing agents include water-dispersing (water-soluble) polyisocyanates, water-dispersing (water-soluble) carbodiimides, water-soluble epoxy compounds, water-dispersing (water-soluble) oxazolidones, water-soluble aziridines and the like.

The aqueous coating agent of the embodiment may further contain a variety of additives within ranges not impeding strength for use as a laminate film for gas barrier or packaging purposes.

As an additive, mention is made, for example, of antioxidants, weathering agents, thermal stabilizers, lubricants, crystal nucleating agents, UV absorbers, plasticizers, antistatic agents, colorants, fillers, surfactants, silane coupling agents and the like.

The aqueous coating agent of the embodiment primarily contains water as a solvent and may also contain a solvent dissolved in or uniformly mixed with water.

The solvents include, for example, alcohols such as methanol, ethanol, isopropanol and the like, ketones such as acetone, methyl ethyl ketone and the like, ethers such as tetrahydrofuran and the like, cellosolves, carbitols, and nitriles such as acetonitrile and the like.

The aqueous coating agent of the embodiment comprises the aqueous polyurethane resin (A), the water-soluble polymer (B) and the inorganic layered mineral (C) as main constituents wherein the solid formulation ratios of the aqueous polyurethane resin (A), the water-soluble polymer (B) and the inorganic layered mineral (C) occupied in the total solids of the aqueous coating agent are approximately, respectively, at 5 to 60 mass % for the aqueous polyurethane resin (A), at 25 to 80 mass % for the water-soluble polymer (B) and at 8 to 20 mass % for the inorganic layered mineral (C) whereby no source of generating harmful substances at the time of disposal is contained.

Unlike ordinary polyurethane resins, the aqueous polyurethane resin (A) has gas barrier properties because of its rigid molecular skeleton and its dried film is insoluble in water like ordinary polyurethane resins, thereby providing a gas barrier film that is low in humidity dependence. However, the gas barrier properties of the aqueous polyurethane resin (A) alone is much inferior to those of polyvinylidene chloride resin. Hence, the inorganic layered mineral (C) is added so as to improve the gas barrier properties depending on the amount of the addition thereby obtaining gas barrier properties equal to or better than those of the polyvinylidene chloride resin. However, as the amount of the inorganic layered mineral (C) increases, the cohesive force of the resulting film abruptly decreases and the adhesion strength for use as a packaging laminate film cannot be held.

Although there is hitherto known a gas barrier film in a composite form of a water-soluble polymer (B) (e.g. a polyvinyl alcohol resin or the like) and a water-swelling inorganic layered mineral (C), the cohesive force of the film and the adhesion strength of the film to a base material are still lowered. Thus, a crosslinking component has to be added.

However, the addition of a crosslinking component prevents a uniform molecular arrangement ensuring good gas barrier properties. Hence, it has been very difficult for the composite film of the water-soluble polymer (B) and the water-swelling inorganic layered mineral (C) to satisfy both good barrier properties in an atmosphere of high humidity and adequate adhesion strength.

In addition, where the gas barrier film is in the form of a laminate film wherein other type of film is bonded by application of an adhesive onto a film side (i.e. on the film), it is required for laminate strength not to be degraded with time.

The aqueous coating agent of the embodiment comprises as main constituents the aqueous polyurethane resin (A), the water-soluble polymer (B) and the inorganic layered mineral (C), the solid formulation ratios of these constituents being controlled within given ranges, so that both good barrier properties of the film made of the aqueous coating agent in an atmosphere of high humidity and adequate adhesion strength (film cohesive strength) for use as a packaging laminate film can be satisfied over a long period of time.

The film made of the aqueous coating agent of the embodiment is excellent in gas barrier properties in an atmosphere of high humidity and good in adhesion of the film to a base material and also in cohesive force of the film.

With a laminate film obtained by bonding other type of film by application of an adhesive onto a film side (or on the film), the lowering of laminate strength is small, so that when using a gas barrier film having the embodied film as a packaging material, the quality retention of a content is enhanced and its use as a variety of packing materials can be made.

Furthermore, the aqueous coating agent of the embodiment can be reduced in generation of harmful substances at the time of disposal.

[Gas Barrier Film]

The gas barrier film of the second embodiment of the invention comprises a base material film, and a film formed on one or both surfaces of the base material film and comprised, as main constituents, of (A) an aqueous polyurethane resin containing a polyurethane resin having an acid group and a polyamine compound, (B) a water-soluble polymer, and (C) an inorganic layered mineral (C), wherein ratios of the aqueous polyurethane resin (A), the water-soluble polymer (B) and the inorganic layered mineral (C) occupied in the film are within ranges indicated below.

Aqueous polyurethane resin (A): 5 to 60 mass %
Water-soluble polymer (B): 25 to 80 mass %
Inorganic layered mineral (C): 8 to 20 mass %

With respect to the aqueous polyurethane resin (A), the water-soluble polymer (B) and the inorganic layered mineral (C) serving as constituents of the gas barrier film of this embodiment, they are, respectively, similar to those illustrated before in the "aqueous coating agent".

In the film acting as a constituent of the gas barrier film of the embodiment, it is preferred that the water-soluble polymer (B) is made of a polyvinyl alcohol resin whose degree of saponification is not less than about 95%.

In the film serving as a constituent of the gas barrier film of the present embodiment, the inorganic layered mineral (C) is preferably made of a water-swelling synthetic mica.

If the aqueous polyurethane resin (A) is contained at less than 5 mass %, the wettability and adhesion of the film to a base material film become insufficient. On the other hand, when the aqueous polyurethane resin (A) exceeds 60 mass %, adhesion strength of the film to a base material film is lowered with time.

If the water-soluble polymer (B) is at less than 25 mass %, cohesive strength for use as a film is lowered with time. On the other hand, when the water-soluble polymer (B) exceeds 80 mass %, the wettability and adhesion of the film to a base material film become insufficient. Additionally, when the water-soluble polymer (B) exceeds 80 mass %, the gas barrier properties of the resulting film are lowered in an atmosphere of high humidity.

When the inorganic layered mineral (C) is contained at less than 8 mass %, adequate gas barrier properties of the film are not obtained. On the other hand, when the inorganic layered mineral (C) exceeds 20 mass %, the adhesion of the film to a base material film and the cohesive strength of the film are lowered as time passes.

In the case where the solid formulation rations are outside the given ranges and the film cohesive strength and the adhesion strength of the film to a base material are lowered with time, the laminate film obtained by bonding other type of film to the film side (or on the film) by dry lamination is degraded in laminate strength with time.

Base Material Film Made of a Plastic Material

For the base material film made of a plastic material, mention is made, for example, of those films of polyolefin resins including poly C2-10 olefins such as polyethylene, polypropylene, propylene-ethylene copolymers and the like, polyester resins such as polyethylene terephthalate, polybutylene terephthalate and the like, aliphatic polyamides such as nylon 6 and nylon 66, polyamide resins including aromatic polyamides such as polymethaxylylene adipamide and the like, vinyl resins such as polystyrene, polyvinyl acetate, ethylene-vinyl acetate copolymer, polyvinyl alcohol, ethylene-vinyl alcohol copolymer and the like, acrylic resins including homopolymers or copolymers of (meth)acrylic monomers such as polymethyl methacrylate, polyacrylonitrile and the like, and cellophane. These resins may be used singly or in combination of two or more.

For the base material film, there is used a single-layer film constituted of a single resin, or a single-layer film or laminate film making use of a plurality of resins. Alternatively, laminate base materials of the type wherein these resins are laminated on other types of base materials such as metals, wood pieces, paper, ceramics and the like) may be used.

Of these, preferred base material films include polyolefin resin films (especially, a polypropylene film), polyester resin films (especially, a polyethylene terephthalate resin film), and polyamide films (especially, nylon films).

The base material film may be either an unstretched film, or a uniaxially stretched film or biaxially stretched film. Those films subjected to a surface treatment (corona discharge treatment), anchor coating, or an undercoating treatment may also be used. Moreover, the base material film may be a laminate film stacked with a plurality of resins or metals.

When the base material film is subjected to a corona treatment, low temperature plasma treatment or the like on a surface to be coated (i.e. a surface on which a film is formed), good wettability to a coating agent and good adhesion to film are ensured.

The thickness of the base material film is not critical and may be appropriately selected depending on the cost and purpose in use while taking fitness for packaging material and lamination aptitude of other type of film into account. The thickness of the base material film is in practice at 3 to 200 µm, preferably at 5 to 120 µm and more preferably at 10 to 100 µm.

Moreover, the gas barrier film of the embodiment may have, if necessary, a print layer, an anchor coat layer, an overcoat layer, a light shielding layer, an adhesive layer, and a heat seal layer.

The film comprised mainly of the aqueous polyurethane resin (A), the water-soluble polymer (B) and the inorganic layered mineral (C) is formed by coating, on a base material film, a coating agent containing at least the aqueous polyurethane resin (A), the water-soluble polymer (B) and the inorganic layered mineral (C) as main constituents according to a known wet coating process, followed by dry removal of a solvent component.

The coating agent used includes, for example, the aqueous coating agent of the first embodiment.

The wet coating methods used include those of roll coating, gravure coating, reverse coating, die coating, screen printing, spray coating and the like.

Using these wet coating methods, a coating agent is coated onto one or both surfaces of a base material film.

For drying the coating agent, there are used known drying methods including such as of hot air drying, hot roll drying, IR irradiation and the like.

The thickness of the dry film formed on the base material film is set depending on the gas barrier properties required. The thickness of the dry film formed on the base material film is preferably at 0.1 to 5 µm, more preferably at 0.2 to 2 µm.

If the dry film thickness is less than 0.1 µm, satisfactory gas barrier properties are unlikely to be obtained. On the other hand, when the dry film thickness exceeds 5 µm, not only a difficulty is involved in providing a uniform coating surface, but also a drying load and production costs increase, thus being unfavorable.

The gas barrier film of this embodiment may further contain a variety of additives within ranges not impeding gas barrier properties and strength for use as a laminate film for packaging The additives include, for example, reactive curing agents such as polyisocyanates, carbodiimide, epoxy compounds, oxazolidone compounds, and aziridine compounds, antioxidants, weathering agents, thermal stabilizers, lubricants, crystal nucleating agents, UV absorbers, plasticizers, antistatic agents, colorants, fillers, surfactants, silane coupling agents and the like.

When a heat-sealable thermal fusion layer is stacked on the gas barrier film of the embodiment, there may be formed a laminate film for gas barrier packaging, which can be hermetically sealed by heat seal.

With the gas barrier film of this embodiment, known adhesives such as polyurethane, polyester and polyether-based ones are used thereby enabling a heat-sealable thermal fusion layer to be laminated according to a known dry lamination method or extrusion lamination method.

Since the gas barrier film of the embodiment has a film made of the aqueous polyurethane resin (A), the water-soluble polymer (B) and the inorganic layered mineral (C) as main constituents and the solid formulation ratios of these constituents are controlled within given ranges, respectively, gas barrier properties in an atmosphere of high humidity are excellent and the adhesion of the film to a base material and the cohesive force of the film are good over a long period of time. Moreover, the gas barrier film of the invention in the form of a laminate film obtained by bonding other type of film by application of an adhesive to the first-mentioned film side (or on the first-mentioned film) is reduced in degradation of laminate strength. Thus, the use of the gas barrier film as a packaging material can enhance the quality retention of a content and can be made of a packaging material.

Further, the gas barrier film of the embodiment is reduced in generation of harmful substances at the time of disposal.

EXAMPLES

Examples and comparative examples are described to more particularly illustrate the invention, which should not be construed as limited to the following examples.

Preparatory Example 45.5 g of methaxylylene diisocyanate (which may be sometimes referred to as "mXDI" hereinafter), 93.9 g of 1,3-bis(isocyanate methyl)cyclohexane (which may be sometimes referred to as "hydrogenated XDI" hereinafter), 24.8 g of ethylene glycol, 13.4 g of dimethylolpropionic acid, and 80.2 g of methyl ethyl ketone serving as a solvent were mixed together, followed by reaction in an atmosphere of nitrogen at 70° C. for 5 hours to prepare a carboxyl group-containing urethane prepolymer solution.

Next, this carboxyl group-containing urethane prepolymer solution was neutralized with 9.6 g of triethylamine at 40° C.

The carboxyl group-containing urethane prepolymer solution was dispersed in 624.8 g of water by means of a homodisper, followed by chain extension reaction with 21.1 g of 2-[(2-aminoethyl)amino]ethanol and distilling off of the methyl ethyl ketone to obtain an acid group-containing polyurethane resin of a water dispersion type having a solid content of 25 mass %, an average particle size of 90 nm and an acid value of 26.9 mg KOH/g.

Thereafter, γ-(2-aminoethyl)aminopropylmethyldimethoxysilane (amine value: 544 mg KOH/g) used as a polyamine compound was mixed at a molar ratio of the acid group and the basic nitrogen atom of 1:1 to obtain an aqueous polyurethane resin of Preparatory Example 1.

Examples 1 to 24

For an aqueous polyurethane resin (A) containing an acid group-containing polyurethane resin and a polyamine compound (which may be sometimes referred to as component (A) hereinafter), there was used the aqueous polyurethane resin of Preparatory Example (Preparatory Example 1), or polyurethane dispersion Takelac WPB-341, manufactured by Mitsui Chemicals, Inc., or polyurethane dispersion Takelac WPB-363, manufactured by Mitsui Chemicals, Inc.

For water-soluble polymer (B) (which may be sometimes referred to as component (B) hereinafter), three types of polyvinyl alcohols indicated below and carboxymethyl cellulose (CMC) were used.

Poval PVA-105 (with a degree of saponification of 98 to 99% and a degree of polymerization of 500), manufactured by Kuraray Co., Ltd.

Poval PVA-110 (with a degree of saponification of 98 to 99% and a degree of polymerization of 1100), manufactured by Kuraray Co., Ltd.

Poval PVA-117 (with a degree of saponification of 98 to 99% and a degree of polymerization of 1700), manufactured by Kuraray Co., Ltd.

For the inorganic layered mineral (C) (which may be sometimes referred to as component (C) hereinafter), there were used two types of water-swelling synthetic micas (Somasif MEB-3, manufactured by Co-op Chemical Co., Ltd., and NTS-5, manufactured by Topy Industrial Co., Ltd.), sodium hectorite (NHT-sol B2, manufactured by Topy Industrial Co., Ltd.) and purified montmorillonite (Kunipia-F, manufactured by Kunimine Industries Co. Ltd.)

The components (A), (B) and (C) were formulated at solid formulation ratios indicated in Tables 1, 2, heated at 80° C. and mixed, followed by cooling down to room temperature and diluting with ion exchange water and isopropanol in such a way that isopropanol was contained in the solvent at 10 mass % and a final solid concentration was made at 9% thereby preparing mixtures. Immediately before coating, curing agents indicated in Tables 1, 2 (water-soluble polyisocyanates, Takenate WD-725 and Takenate WD-730, all manufactured by Mitsui Chemicals Inc.) were, respectively, added to the mixtures to prepare aqueous coating agents of Examples 1-24.

Comparative Examples 1 to 4

As an ordinary water-soluble polyurethane resin, there were used, instead of the component (A), polyester/polyurethane resin aqueous solution Hydran HW350, manufactured by DIC Inc., and polyether polyurethane resin aqueous solution Estran H-38, manufactured by DKS Co., Ltd.

For the component (B), polyvinyl alcohol resin Poval PVA-117 (with a degree of saponification of 98 to 99% and a degree of polymerization of 1700), manufactured by Kuraray Co., Ltd., was used.

For the component (C), there was used a water-swelling synthetic mica (Somasif MEB-3, manufactured by Co-op Chemical Co, Ltd.).

The components (A), (B) and (C) were formulated at solid formulation ratios indicated in Table 3, heated at 80° C. and mixed, followed by cooling down to room temperature and diluting with ion exchange water and isopropanol in such a way that a content of isopropanol in the solvent was made at 10% and a final solid concentration was at 9% thereby preparing mixtures. Immediately before coating, a curing agent (Takenate WD-725, manufactured by Mitsui Chemicals Inc.) indicated in Table 3 was added to the mixtures to prepare aqueous coating agents of Comparative Examples 1 to 4.

Comparative Examples 5 to 18

As the component (A), there were used the aqueous polyurethane resin of Preparatory Example (Preparatory Example 1) and polyurethane dispersion Takelac WPB-341, manufactured by Mitsui Chemicals Inc.

For the component (B), there were used polyvinyl alcohol resin Poval PVA-110 (with a degree of saponification of 98 to 99% and a degree of polymerization of 1000), manufactured by Kuraray Co., Ltd., and carboxymethyl cellulose (CMC).

For the component (C), there were used a water-swelling synthetic mica (Somasif MEB-3, manufactured by Co-op Chemical Co., Ltd.) and purified montmorillonite (Kunipia-F, manufactured by Kunimine Industries Co. Ltd.).

The components (A), (B) and (C) were formulated at solid formulation ratios indicated in Table 3, heated at 80° C. and mixed, followed by cooling down to room temperature and diluting with ion exchange water and isopropanol in such a way that a content of isopropanol in the solvent was made at 10% and a final solid concentration was at 9% thereby preparing mixtures. Immediately before coating, a curing agent (water-soluble polyisocyanate Takenate WD-725, manufactured by Mitsui Chemicals Inc.) indicated in Table 3 was added to the mixtures to prepare aqueous coating agents of Comparative Examples 5 to 18.

The aqueous coating agents of Examples 1 to 24 and Comparative Examples 1 to 18 were each coated, by use of a gravure coater, onto biaxially stretched polyethylene terephthalate film P-60 (PET with a thickness of 12 μm), manufactured by Toray Co., Ltd., or a corona-treated surface of biaxially stretched polypropylene film U-1 (OPP with a thickness of 20 μm), manufactured by Mitsui Chemicals Tocello, Inc., in a dry coating amount of 1 g/m2, followed by drying by passage through an oven at 90° C. for 10 seconds, thereby obtaining gas barrier films of Examples 1 to 24 and Comparative Examples 1 to 18.

[Evaluation]

(Oxygen Gas Barrier Property)

With respect to the gas barrier films of Examples 1 to 24 and Comparative Examples 1 to 18, the oxygen gas barrier property was measured by use of an oxygen permeation measuring apparatus (OXTRAN-2/20 manufactured by MOCON Inc.) at 20° C. in an atmosphere of a humidity of 80%. The results are shown in Tables 1-3.

(Laminate Strength)

A 30 μm thick unstretched polypropylene film (CPP GLC, manufactured by Mitsui Chemicals Tocello, Inc.) was laminated on a coating side (on a surface to be coated) of the respective gas barrier films of Examples 1 to 24 and Comparative Examples 1 to 18 by dry lamination through a polyester polyurethane adhesive (Takelac A-525, manufactured by Mitsui Chemicals, Inc./Takenate A-52, manufactured by Mitsui Chemicals, Inc.), followed by aging (aging) at 40° C. for 48 hours to obtain laminate films.

The laminate film was cut into a 15 mm wide strip, followed by subjecting to 90° peeling at a rate of 300 mm/minute by means of a tensile tester Tensilon to measure laminate strength. The results are shown in Tables 1 to 3.

(Laminate Strength After Two Months Under Conditions of 40° C. and a Humidity of 75%)

A 30 μm thick unstretched polypropylene film (CPP GLC, manufactured by Mitsui Chemicals Tocello, Inc.) was laminated on a coating side (on a surface to be coated) of the respective gas barrier films of Examples 1 to 24 and Comparative Examples 1 to 18 by dry lamination through a polyester polyurethane adhesive (Takelac A-525, manufactured by Mitsui Chemicals, Inc./Takenate A-52, manufactured by Mitsui Chemicals, Inc.), followed by aging (aging) at 40° C. for 48 hours to obtain laminate films.

The laminate films were each stored over 2 months in a thermostatic chamber under conditions of 40° C. and a humidity of 75%.

The laminate film was cut into a 15 mm wide strip, followed by subjecting to 90° peeling at a rate of 300 mm/minute by means of a tensile tester Tensilon to measure laminate strength. The results are shown in Tables 1 to 3.

TABLE 1

|  | Example 1 | Example 2 | Example 3 | Example 4 | Example 5 | Example 6 |
|---|---|---|---|---|---|---|
| A | Preparatory Example | Preparatory Example | Preparatory Example | Preparatory Example | Preparatory Example | Preparatory Example |
| Formulation ratio (%) | 50 | 35 | 20 | 30 | 60 | 7 |
| B | PVA105 | PVA105 | PVA105 | PVA105 | PVA105 | PVA105 |
| Formulation ratio (%) | 25 | 40 | 55 | 70 | 25 | 80 |
| C | Somasif | Somasif | Somasif | Somasif | Somasif | Somasif |
| Formulation ratio (%) | 15 | 15 | 15 | 15 | 8 | 8 |
| Curing agent | WD-725 | WD-725 | WD-725 | WD-725 | WD-725 | WD-725 |
| Formulation ratio (%) | 10 | 10 | 10 | 10 | 7 | 5 |
| Base material film | OPP | OPP | OPP | OPP | OPP | OPP |
| Oxygen permeation rate ($cm^3/(m^2$-24 hrs.-atm) | 4 | 4 | 4 | 4 | 7 | 7 |
| Laminate strength (N/15 mm) | 1.4 | 1.8 | 2 | 1.8 | 2.3 | 2.1 |
| Laminate strength after 2 months (N/15 mm) | 1.1 | 1.3 | 1.4 | 1.5 | 1.4 | 1.5 |

|  | Example 7 | Example 8 | Example 9 | Example 10 | Example 11 | Example 12 |
|---|---|---|---|---|---|---|
| A | Preparatory Example | Preparatory Example | WPB363 | WPB363 | WPB363 | WPB363 |
| Formulation ratio (%) | 30 | 5 | 50 | 50 | 50 | 50 |
| B | PVA105 | PVA105 | PVA110 | PVA117 | CMC | PVA117 |
| Formulation ratio (%) | 40 | 65 | 25 | 25 | 25 | 25 |
| C | Somasif | Somasif | Somasif | Somasif | Somasif | Somasif |
| Formulation ratio (%) | 20 | 20 | 15 | 15 | 15 | 15 |
| Curing agent | WD-725 | WD-725 | WD-725 | WD-725 | WD-725 | WD-730 |
| Formulation ratio (%) | 10 | 10 | 10 | 10 | 10 | 10 |
| Base material film | OPP | OPP | OPP | OPP | OPP | PET |
| Oxygen permeation rate ($cm^3/(m^2$-24 hrs.-atm) | 6 | 6 | 3 | 3 | 4 | 2 |
| Laminate strength (N/15 mm) | 1.4 | 1.6 | 1.5 | 1.6 | 1.5 | 1.9 |
| Laminate strength after 2 months (N/15 mm) | 1.1 | 1.3 | 1.1 | 1.2 | 1.1 | 1.4 |

TABLE 2

|  | Example 13 | Example 14 | Example 15 | Example 16 | Example 17 | Example 18 |
|---|---|---|---|---|---|---|
| A | WPB363 | WPB363 | WPB363 | WPB363 | WPB341 | WPB341 |
| Formulation ratio (%) | 50 | 50 | 40 | 40 | 40 | 40 |
| B | PVA117 | PVA117 | PVA117 | CMC | PVA117 | CMC |
| Formulation ratio (%) | 30 | 30 | 30 | 30 | 33 | 33 |
| C | NTS-5 | NHT | Kunipia F | Kunipia F | Somasif | Somasif |
| Formulation ratio (%) | 10 | 10 | 20 | 20 | 12 | 12 |
| Curing agent | WD-725 | WD-725 | WD-725 | WD-725 | WD-725 | WD-725 |
| Formulation ratio (%) | 10 | 10 | 10 | 10 | 10 | 10 |
| Base material film | PET | PET | PET | PET | OPP | OPP |
| Oxygen permeation rate ($cm^3/(m^2$-24 hrs.-atm) | 3 | 2 | 3 | 4 | 5 | 6 |
| Laminate strength (N/15 mm) | 1.7 | 1.7 | 2.2 | 2.1 | 1.7 | 1.6 |

TABLE 2-continued

| | | | | | | |
|---|---|---|---|---|---|---|
| Laminate strength after 2 months (N/15 mm) | 1.1 | 1.3 | 1.7 | 1.6 | 1.3 | 1.2 |

| | Example 19 | Example 20 | Example 21 | Example 22 | Example 23 | Example 24 |
|---|---|---|---|---|---|---|
| A | WPB341 | WPB341 | WPB341 | WPB341 | WPB341 | WPB341 |
| Formulation ratio (%) | 40 | 40 | 40 | 40 | 25 | 25 |
| B | PVA117 | CMC | PVA117 | CMC | PVA117 | CMC |
| Formulation ratio (%) | 33 | 33 | 33 | 33 | 45 | 45 |
| C | NTS-5 | NTS-5 | NHT | NHT | Kunipia F | Kunipia F |
| Formulation ratio (%) | 12 | 12 | 12 | 12 | 20 | 20 |
| Curing agent | WD-725 | WD-725 | WD-725 | WD-725 | WD-725 | WD-725 |
| Formulation ratio (%) | 10 | 10 | 10 | 10 | 10 | 10 |
| Base material film | OPP | OPP | OPP | OPP | OPP | OPP |
| Oxygen permeation rate (cm$^3$/(m$^2$-24 hrs.-atm) | 3 | 4 | 3 | 4 | 4 | 5 |
| Laminate strength (N/15 mm) | 1.5 | 1.4 | 1.6 | 1.7 | 2.1 | 2 |
| Laminate strength after 2 months (N/15 mm) | 1.1 | 1.1 | 1.3 | 1.4 | 1.8 | 1.6 |

TABLE 3

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| A | HW350 | H-38 | HW350 | HW350 | Preparatory Example | WPB341 | Preparatory Example | Preparatory Example | WPB341 | — |
| Formulation ratio (%) | 45 | 30 | 50 | 30 | 100 | 100 | 90 | 75 | 75 | 0 |
| B | PVA117 | PVA117 | PVA117 | PVA117 | — | — | — | — | — | PVA110 |
| Formulation ratio (%) | 30 | 45 | 25 | 40 | 0 | 0 | 0 | 0 | 0 | 85 |
| C | Somasif | Somasif | Somasif | Somasif | — | — | — | Somasif | Somasif | Somasif |
| Formulation ratio (%) | 15 | 15 | 15 | 20 | 0 | 0 | 0 | 15 | 15 | 15 |
| Curing agent | WD-725 | WD-725 | WD-725 | WD-725 | — | — | WD-725 | WD-725 | WD-725 | — |
| Formulation ratio (%) | 10 | 10 | 10 | 10 | 0 | 0 | 10 | 10 | 10 | 0 |
| Base material film | OPP | OPP | PET | OPP | PET | PET | PET | PET | PET | PET |
| Oxygen permeation rate (cm$^3$/(m$^2$-24 hrs.-atm) | <35 | <25 | <30 | <20 | 74 | 69 | 85 | 3 | 3 | 18 |
| Laminate strength (N/15 mm) | 1.7 | 1.5 | 1.7 | 1.5 | 1.8 | 1.9 | 2.2 | 0.3 | 0.3 | 0.1 |
| Laminate strength after 2 months (N/15 mm) | 1.2 | 1 | 1.2 | 1.1 | 1.4 | 1.3 | 1.7 | 0.3 | 0.3 | 0.1 |

| | Comp. Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 |
|---|---|---|---|---|---|---|---|---|
| A | — | — | Preparatory Example | Preparatory Example | Preparatory Example | Preparatory Example | Preparatory Example | Preparatory Example |
| Formulation ratio (%) | 0 | 0 | 65 | 3 | 75 | 55 | 60 | 25 |
| B | CMC | PVA110 | PVA110 | PVA110 | PVA110 | PVA110 | PVA110 | PVA110 |
| Formulation ratio (%) | 85 | 85 | 10 | 75 | 10 | 30 | 10 | 40 |
| C | Somasif | Kunipia F | Somasif | Somasif | Somasif | Somasif | Somasif | Somasif |
| Formulation ratio (%) | 15 | 15 | 15 | 15 | 5 | 5 | 25 | 25 |
| Curing agent | — | — | WD-725 | WD-725 | WD-725 | WD-725 | WD-725 | WD-725 |
| Formulation ratio (%) | 0 | 0 | 10 | 7 | 10 | 10 | 10 | 10 |
| Base material film | PET | PET | PET | PET | PET | PET | PET | PET |
| Oxygen permeation rate (cm$^3$/(m$^2$-24 hrs.-atm) | 22 | 30 | 2 | 6 | 24 | 30 | 1 | 1 |
| Laminate strength (N/15 mm) | 0.1 | 0.3 | 1 | 0.2 | 2.5 | 2.7 | 0.4 | 0.8 |
| Laminate strength after 2 months (N/15 mm) | 0.1 | 0.2 | 0.3 | 0.2 | 1.3 | 1.8 | 0.3 | 0.4 |

The results of Table 3 reveal that since the gas barrier films of Comparative Examples 1 to 4 make use of the aqueous polyurethanes that are free of a polyurethane resin having an acid group and a polyamine compound, the gas barrier properties of the aqueous polyurethane are low and the oxygen permeation rate in an atmosphere of 20° C. and a humidity of 80% is not less than 20 cm3/m2-24 hrs-atm, and thus, the oxygen gas barrier properties could not be satisfactory.

From the results of Table 3, it has been found that the gas barrier films of Comparative Examples 5 to 12, which are absent of any of the components (A), (B) and (C), are much poor either in oxygen permeation rate or in laminate strength.

From the results of Table 3, it has been found that the gas barrier films of Comparative Examples 13 to 18, in which any of the formulation ratios of the components (A), (B) and (C) are outside the ranges of this embodiment, become poor either in oxygen permeation rate or in laminate strength.

On the other hand, the results of Tables 1 to 2 reveal that the gas barrier films of Examples 1 to 24, in which the components (A), (B) and C) are formulated at solid formulation ratios defined in the embodiment, have oxygen permeation rates of not larger than 10 cm3/m2-24 hrs-atm at 20° C. in an atmosphere of a humidity of 80% and thus have good oxygen barrier properties. Moreover, the gas barrier films of Examples 1 to 24 keep a laminate strength of not less than 1.0 N/15 mm after storage in an atmosphere of 40° C. and 75% RH over 2 months, thus ensuring the strength sufficient for use as a packaging material under ordinary distribution conditions.

INDUSTRIAL APPLICABILITY

The gas barrier film of the invention can satisfy both high gas barrier properties in an high humidity atmosphere, and adequate strength of adhesion to a base material and adequate cohesive strength of the film. When the laminate film, obtained by bonding the gas barrier film of the invention by application of an adhesive onto the film side (or on the film), is stored in a high humidity atmosphere over a long time, the lowering of laminate strength is so small as to enable it to be utilized as a variety of packaging materials in many fields. Where the gas barrier film of the invention is used as a packaging material, the quality of a content can be stably secured over a long period of time. Additionally, the gas barrier laminate of the invention can reduce generation of harmful substances upon wastage.

What is claimed is:

1. An aqueous coating agent, comprising:
   (A) an aqueous polyurethane resin containing a polyurethane resin having an acid group and a polyamine compound,
   (B) a water-soluble polymer comprising polyvinyl alcohol, and
   (C) an inorganic layered mineral as main constituents,
   wherein solid formulation ratios of the aqueous polyurethane resin (A), the water-soluble polymer (B) and the inorganic layered mineral (C) occupied in a total solid content of the aqueous coating agent are within approximate ranges indicated below:
   aqueous polyurethane resin (A): 5 to 60 mass %,
   water-soluble resin (B): 25 to 80 mass %,
   inorganic layered compound (C): 8 to 20 mass %,
   wherein the acid group of the polyurethane resin is at least one of a carboxyl group or a sulfonic group, and
   wherein the inorganic layered compound comprises water-swellable mica having an average particle size of 1 to 10 µm and a thickness of 10 to 100 nm.

2. The aqueous coating agent of claim 1, wherein the water-soluble polymer (B) is made of a polyvinyl alcohol resin having a degree of saponification of not less than about 95%.

3. The aqueous coating agent of claim 1, wherein the inorganic layered compound comprises the water-swellable mica, which is synthetic, and purified montmorillonite.

4. A gas barrier film, comprising:
   a base material film made of a plastic material, and
   a film which is formed on one or opposite surfaces of the base material film and is comprised of
   (A) an aqueous polyurethane resin containing a polyurethane resin having an acid group and a polyamine compound,
   (B) a water-soluble polymer comprising polyvinyl alcohol, and
   (C) an inorganic layered mineral as main constituents,
   wherein solid formulation ratios of the aqueous polyurethane resin (A), the water-soluble polymer (B) and the inorganic layered mineral (C) in a total solid content of the aqueous coating agent are within approximate ranges indicated below:
   aqueous polyurethane resin (A): 5 to 60 mass %,
   water-soluble resin (B): 25 to 80 mass %,
   inorganic layered mineral (C): 8 to 20 mass %,
   wherein the acid group of the polyurethane resin is at least one of a carboxyl group or a sulfonic group, and
   wherein the inorganic layered compound comprises water-swellable mica having an average particle size of 1 to 10 µm and a thickness of 10 to 100 nm.

5. The gas barrier film of claim 4, wherein the water-soluble polymer (B) is made of a polyvinyl alcohol resin having a degree of saponification of not less than about 95%.

6. The gas barrier film of claim 4, wherein the inorganic layered compound (C) comprises the water-swellable mica, which is synthetic, and purified montmorillonite.

* * * * *